United States Patent [19]

Oprescu et al.

[11] Patent Number: 5,485,458

[45] Date of Patent: Jan. 16, 1996

[54] BUS INTERCONNECT CIRCUIT INCLUDING PORT CONTROL LOGIC FOR A MULTIPLE NODE COMMUNICATION NETWORK

[75] Inventors: Florin Oprescu, Sunnyvale; Roger W. Van Brunt, San Francisco, both of Calif.

[73] Assignee: Apple Computer, Inc., Cupertino, Calif.

[21] Appl. No.: 27,015

[22] Filed: Mar. 5, 1993

[51] Int. Cl.[6] ........................... H04L 12/413; H04L 12/44
[52] U.S. Cl. ...................... 370/85.2; 370/94.3; 370/85.13
[58] Field of Search ............................ 370/85.13, 85.14, 370/94.1, 94.2, 94.3, 60, 60.1, 67, 97, 85.9, 85.6, 85.1, 85.2, 85.3, 85.4, 85.5, 85.11; 340/825.5, 825.51, 825.06, 825.07; 375/121, 7, 8, 36

[56] References Cited

U.S. PATENT DOCUMENTS

| | | | |
|---|---|---|---|
| 4,349,870 | 9/1982 | Shaw et al. | 364/200 |
| 4,707,827 | 11/1987 | Bione et al. | 370/85.13 |
| 4,719,458 | 1/1988 | Miesterfeld et al. | 340/825.5 |
| 4,897,784 | 1/1990 | Nay | 364/200 |
| 4,897,841 | 1/1990 | Gang, Jr. | 370/85.13 |
| 4,985,892 | 1/1991 | Camarata | 370/123 |
| 5,073,982 | 12/1991 | Viola et al. | 370/94.3 |
| 5,107,257 | 4/1992 | Fukuda | 340/825.08 |
| 5,119,398 | 6/1992 | Webber | 375/7 |
| 5,200,743 | 4/1993 | St. Martin et al. | 340/825 |
| 5,249,183 | 9/1993 | Wong et al. | 370/85 |
| 5,311,114 | 5/1994 | Sambamurthy et al. | 370/31 |
| 5,339,307 | 8/1994 | Curtis | 370/13.1 |

FOREIGN PATENT DOCUMENTS

| | | |
|---|---|---|
| 0125773 | 4/1987 | European Pat. Off. |
| 3710813 | 11/1987 | Germany |

OTHER PUBLICATIONS

P1394 Working Group of the Microprocessor and Microcomputer Standards Committee, "High Performance Serial Bus", *The Institute of Electrical and Electronic Engineers, Inc.*, Draft 4.2, Nov. 6, 1991.

P1394 Working Group of the Microprocessor and Microcomputer Standards Committee, "High Performance Serial Bus", *The Institute of Electrical and Electronic Engineers, Inc.*, Draft 5.0v1, Mar. 8, 1992.

P1394 Working Group of the Microprocessor and Microcomputer Standards Committee, "High Performance Serial Bus", *The Institute of Electrical and Electronic Engineers, Inc.*, Draft 5.3v1, Oct. 14, 1992.

James, David. V., "Scalable I/O Architecture for Buses," *IEEE*, 1989, pp. 539–544.

Teener, Michael, "A Bus on a Diet–The Serial Bus Alternative–An Introduction to the P1394 High Performance Serial Bus", *IEEE*, 1992, pp. 316–321.

Hewlett Packard Journal, vol. 38, No. 6, Jun. 1987, Palo Alto, pp. 8–12, "The Hewlett Packard Human Interface Link".

*Primary Examiner*—Wellington Chin
*Attorney, Agent, or Firm*—Blakely, Sokoloff, Taylor & Zafman

[57] ABSTRACT

A bus interconnect device including port control logic for a communication network having a plurality of multi-port nodes that are connected with point-to-point links. Each node includes a transceiver, turn around logic that controls the transceiver, and a dominant logic physical bus that is coupled to all ports in a node. A bus interconnect device includes a first port, a second port, and a point-to-point link between the first and second ports. During arbitration, from the viewpoint of each node, the bus interconnect devices cause the plurality of physical buses to appear to be a single logical bus having a dominant logic. During data transfer following arbitration, the bus interconnect devices are configured to transmit data from the winning node to all other nodes.

21 Claims, 8 Drawing Sheets

FIG_1

FIG_3

FIG_6

EXAMPLE ONE: ARBITRATION AND DATA TRANSFER

| MODE | | ARBITRATION | | | | | | | | DATA TRANSFER | |
|---|---|---|---|---|---|---|---|---|---|---|---|
| TIME → | $T_0$ | $T_1$ | $T_2$ | $T_3$ | $T_4$ | $T_5$ | $T_6$ | $T_7$ | $T_8$ | $T_9$ ... |
| FIRST NODE 100 (FIRST BUS 126) | | 1 | 1 | 1 | 1 | 1 | 1 | 0 | 0 | 1 |
| SECOND NODE 102 (SECOND BUS 150) | | 1 | 0 | 0* ⌐400 | 0* | 0* | 0* | 0* ⌐402 | 0 | 1 |
| THIRD NODE 104 (THIRD BUS 152) | | 1 | 1 | 1 | 0 | 0 | 1 | 0* | 0 | 1 |
| DIGITAL VALUE ON SINGLE LOGICAL BUS | | 1 | 1 | 1 | 0 | 0 | 1 | 0 | 0 | 1 |
| FIRST TRANSMITTER 122a | OFF | OFF | ON | ON | ON(P) | ON | ON | ON (P) | ON → | |
| SECOND TRANSMITTER 122b | OFF | OFF | OFF | OFF (OFF)←410 | OFF(P) | ON | ON | ON (P) | ON → | |
| THIRD TRANSMITTER 122c | ON | ON | (ON) | OFF | OFF(P) | OFF | OFF (OFF)←412 | OFF (P) | OFF → | |
| FOURTH TRANSMITTER 122d | ON | ON | ON | ON | ON(P) | (ON) | OFF | OFF (P) | OFF → | |

* DENOTES NODE HAS LOST ARBITRATION AND THEREFORE OUTPUTS "0", THE NON-DOMINANT STATE.
(P) DENOTES THAT THE CURRENT STATE IS THE SAME AS THE PREVIOUS STATE.

FIG. 7

EXAMPLE TWO: ARBITRATION AND DATA TRANSFER

| MODE | | ARBITRATION | | | | DATA TRANSFER | |
|---|---|---|---|---|---|---|---|
| TIME → | $T_0$ | $T_1$ | $T_2$ | $T_3$ | $T_4$ | $T_5$ | $T_6$ ... |
| FIRST NODE 100 (FIRST BUS 126) | | 1 | 1 | 0 | 0* | 1 | 0 |
| SECOND NODE 102 (SECOND BUS 150) | | 1 | 1 | 1 | 0 | 1 | 0 |
| THIRD NODE 104 (THIRD BUS 152) | | 1 | 0* | 0* | 0* | 1 | 0 |
| DIGITAL VALUE ON SINGLE LOGICAL BUS | | 1 | 1 | 1 | 0 | 1 | 0 |
| FIRST TRANSMITTER 122a | ON | ON | ON | ON OFF(P) | OFF(P) 460 | OFF | ↑ |
| SECOND TRANSMITTER 122b | OFF | OFF | ON | ON | ON(P) | ON | ↑ |
| THIRD TRANSMITTER 122c | OFF | OFF | OFF | ON ON OFF 450 | ON(P) | ON | ↑ |
| FOURTH TRANSMITTER 122d | ON | ON | OFF | OFF | OFF(P) | OFF | ↑ |

FIG_9

BUS INTERCONNECT CIRCUIT INCLUDING PORT CONTROL LOGIC FOR A MULTIPLE NODE COMMUNICATION NETWORK

BACKGROUND OF THE INVENTION

1. Field of the Invention

The present invention relates to communication networks having multiple nodes which arbitrate for bus access. More specifically, the present invention relates to interconnecting a plurality of nodes with point-to-point links, and includes the port control logic within each port that controls signal flow during arbitration and data transfer.

2. Description of Related Art

Every communication system having many devices (nodes) that compete for a limited resource (a communication bus) must first arbitrate to determine which one node will next use the bus. After the winning node is determined, the communication system must allow that winning node to use the bus without interference from the other nodes. Thus, a bus architecture for a communication system must be designed to facilitate both arbitration and data transfer.

One common bus architecture includes a single physical bus, for example a cable, that is directly connected to each node. Any node coupled to the single cable can transmit a signal which is received by other nodes. Therefore, the single cable is designed for communication between any of the nodes. The single bus architecture is particularly useful for arbitration because any node must be able to place a signal on the bus during arbitration and all other nodes must receive that signal. Arbitration methods for a single bus are well known, and may include any method such as collision detection, collision avoidance, and token passing.

One possible implementation of single-bus arbitration uses a bus that has a dominant logic. As an example, a two-state dominant "high" bus is constructed such that if at least one node drives the bus to a "high" state then all the nodes detect a "high" state on the bus. All the nodes detect a "low" state on the bus if and only if all the nodes drive the bus to the "low" state.

During arbitration, those nodes requesting bus access drive the dominant logic bus with a distinct sequence of "high" and "low" values. As long as this sequence is distinct for all nodes involved in the arbitration process one and only one node will win.

After the sequence is finished, one and only one node has won, and therefore the bus arbitration phase is complete and the data transfer phase starts. The winning device becomes a bus driver for transmitting data while the rest of the devices connected to the bus become bus receivers for receiving data. Because only one node is transmitting, a bidirectional bus is not required during the data transfer phase. In the single bus example, transmitted data propagates unidirectionally from the winning node to each of the receiving nodes.

Thus, a single physical bus has a number of disadvantages which become very apparent at greater lengths and higher rates of communication. This disadvantage is particularly troublesome during the data transfer phase. In general, length and design can greatly affect the bandwidth of a bus, thereby limiting the maximum speed at which data can be transferred.

One particular problem with a single physical bus is the number of taps made into the cable to connect the devices. Each tap introduces an impedance discontinuity, causing reflections and losses which adversely affect electrical performance. The more taps, the more performance is degraded. Impedance discontinuities can be avoided by the use of splitters; however splitters are expensive, and they cause one-half of the power to be diverted in each of two directions. Therefore even a few splitters will greatly reduce power and substantially degrade performance.

If a single physical bus is implemented in a silicon chip, interconnection technologies currently available can greatly reduce the problem with impedance discontinuities. However, for devices that may be distributed over many meters, a single silicon bus is simply not feasible.

It would be an advantage to provide a communication network that could connect a plurality of short physical buses into a single logical bus for high speed data transfer. It would be a further advantage if the nodes of the communication system have a plurality of ports that can be connected by point-to-point links, thereby providing a significant speed advantage compared with traditional multi-access buses. It would be an advantage if the nodes have a bus architecture that automatically provides a first bus configuration for arbitration in which the bus can be treated as a single logical bus, and following arbitration, the bus interconnects are oriented in the correct direction so that all receiving nodes can receive the data packet generated by the transmitting node. This second bus configuration would provide for high speed unidirectional data transfer without the bandwidth limitations of a single bus.

One problem with creating a connection between two dominant logic buses is the possibility of "a latch-up" that could occur if the both bus transmitters transmit at the same time. In that instance, the dominant state perpetuates itself with positive feedback which renders the entire system non-operational or "latched up". If each node is controlled only by itself without central control, each node will not know that the other node is latched up, and therefore this latched up condition is difficult to detect and prevent. It would be an advantage to provide an interconnect system that avoids the latch-up problem without central control.

SUMMARY OF THE INVENTION

The present invention provides a bus interconnect device including port control logic for a communication network having a plurality of multi-port nodes that are connected with point-to-point links in a tree topology. Each node includes one or more ports and a physical bus that is coupled to all ports in a node. This bus interconnect device includes two ports and a point-to-point link that connects them. A network would utilize many such bus interconnect devices to communicate between multiple nodes. During arbitration, the bus interconnect devices operate so that, from the viewpoint of each node, the physical buses appear to be a single logical bus. During data transfer following arbitration, the bus interconnect devices are configured to transmit data at high speed from the winning node to all other nodes.

Each physical bus includes a circuit for implementing a dominant state, which is "high" in the described embodiment. Each port includes control logic, referred to as "turn-around logic," that controls the transceiver within each port. Specifically, the turn around logic controls one of the transmitters and receivers to control whether the transceiver is receiving or transmitting. Control of the transmitter is equivalent to control of the receiver, because a transmitter in one node is coupled to a receiver in another node, and even if a signal is transmitted, it will not be received unless the receiver is operational. In the preferred embodiment, the turn-around logic controls the transmitters. At all times, latch-up is prevented by allowing only one of the two interconnected transmitters to transmit at one time. The turn around logic controls the direction of data flow so that bidirectional data flow is provided during arbitration and unidirectional data flow is provided during data transfer.

During arbitration, the turn around logic for each port operates together with turn around logic for all other ports so that each of the physical buses has the same digital value. For arbitration, a dominant state logic is implemented throughout the communication system by ensuring that the existence of a dominant state on the physical bus segment is propagated to all other physical buses. Bus arbitration is performed by any conventional technique that utilizes dominant logic. At the end of bus arbitration, the receivers and transmitters are oriented in the correct direction by the arbitration winner. Thus, the physical buses operate as a single logical bus during arbitration even though they are physically separate.

Throughout data transfer, the direction of signal flow has the direction last selected during arbitration, which is a unidirectional flow from the winning node to all other nodes. The port control logic controls the transceivers to unilaterally transfer data from the arbitration winner to all other nodes, going through one or more nodes which function as repeaters. In other words, the port control logic maintains the signal flow in the direction of the winner in arbitration. Because no switching is required during data transfer, one advantage is facilitation of high speed data transfer. Furthermore, in any one port only one of the transmitter or receiver is operable at any arbitrary time, therefore preventing latch-up during both arbitration and data transfer.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 6 is a first example of arbitration and data transfer, illustrating the value on the single logical bus and the state of the transmitters in each port illustrated in FIGS. 4 and 5.

FIG. 8 is a block diagram of a bus interconnect device for connecting two closely positioned buses.

DETAILED DESCRIPTION OF THE PREFERRED EMBODIMENT

FIGS. 1 through 9 of the drawings disclose various embodiments and aspects of the present invention for purposes of illustration only. One skilled in the art will readily recognize from the following discussion that alternative embodiments of the structures and methods illustrated herein may be employed without departing from the principles of the invention.

Figure 1:
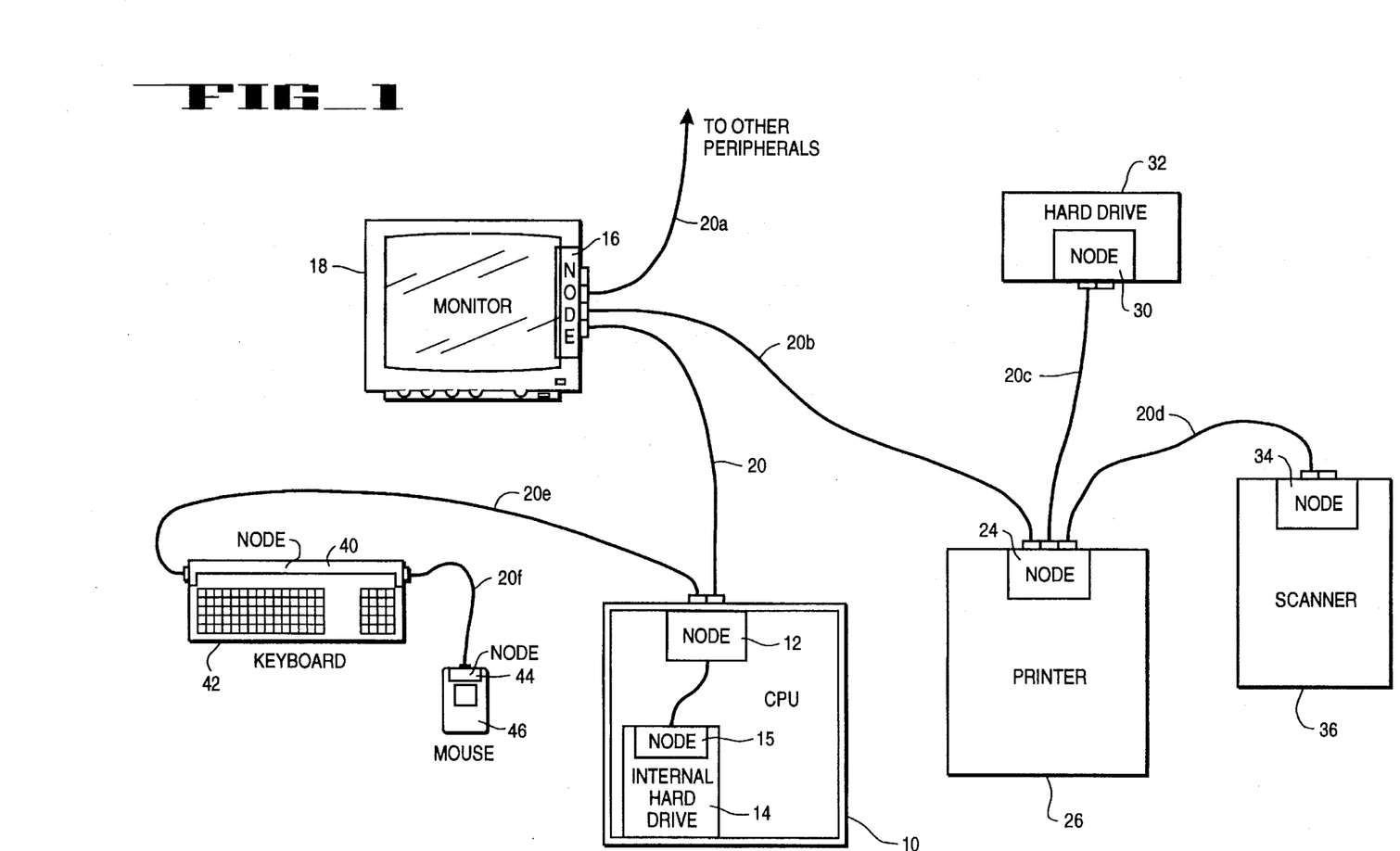
FIG. 1 is a block diagram of a computer system including peripherals connected between each other by a plurality of nodes and point-to-point links.

Reference is made to FIG. 1 which illustrates a computer environment in which nodes according to the present invention are useful for performing communication functions such as arbitration and data transfer. It will be apparent that the environment illustrated therein is only one of many possible uses for the nodes, and that many other communication systems can utilize them. The computer environment of FIG. 1 illustrates a CPU unit 10 including a node 12. The CPU node 12 is connected to an internal hard drive 14 which has its own node 15, and can be treated like an external peripheral. A cable 20 connects the CPU node 12 with a node 16 in a monitor 18. A cable 20a connects the monitor node 16 with other peripherals, and a cable 20b connects the monitor node 16 with another node 24 in a printer 26. From the printer node 24, a cable 20c connects with a node 30 in a hard drive 32. Also from the printer node 24, a cable 20d connects with a node 34 in a scanner 36.

Returning to the CPU 10, the CPU port 12 is connected to a node 40 and the keyboard 42, and the keyboard node 40 is also connected to a node 44 in the mouse 46. In general, each node is connected to its respective device, which defines the "local host" for that node. For example in FIG. 1, the CPU 10 is the local host for the CPU node 12, the monitor 18 is the local host for the monitor node 16, and so forth. However, it is not necessary for every node to have a local host. The organization and operation of the nodes are described herein.

Each of the above nodes 12, 18, 24, 30, 34, 40, and 44 may have identical construction, although some of the nodes, such as the mouse node 44, can be simplified because of their specific functions. Thus, the nodes can be constructed to meet the needs of the particular local host. For example, each node has one or more ports. The number of ports varies according to need: the CPU port 12 has three ports, while the mouse node 44 has only one port.

Figure 2:
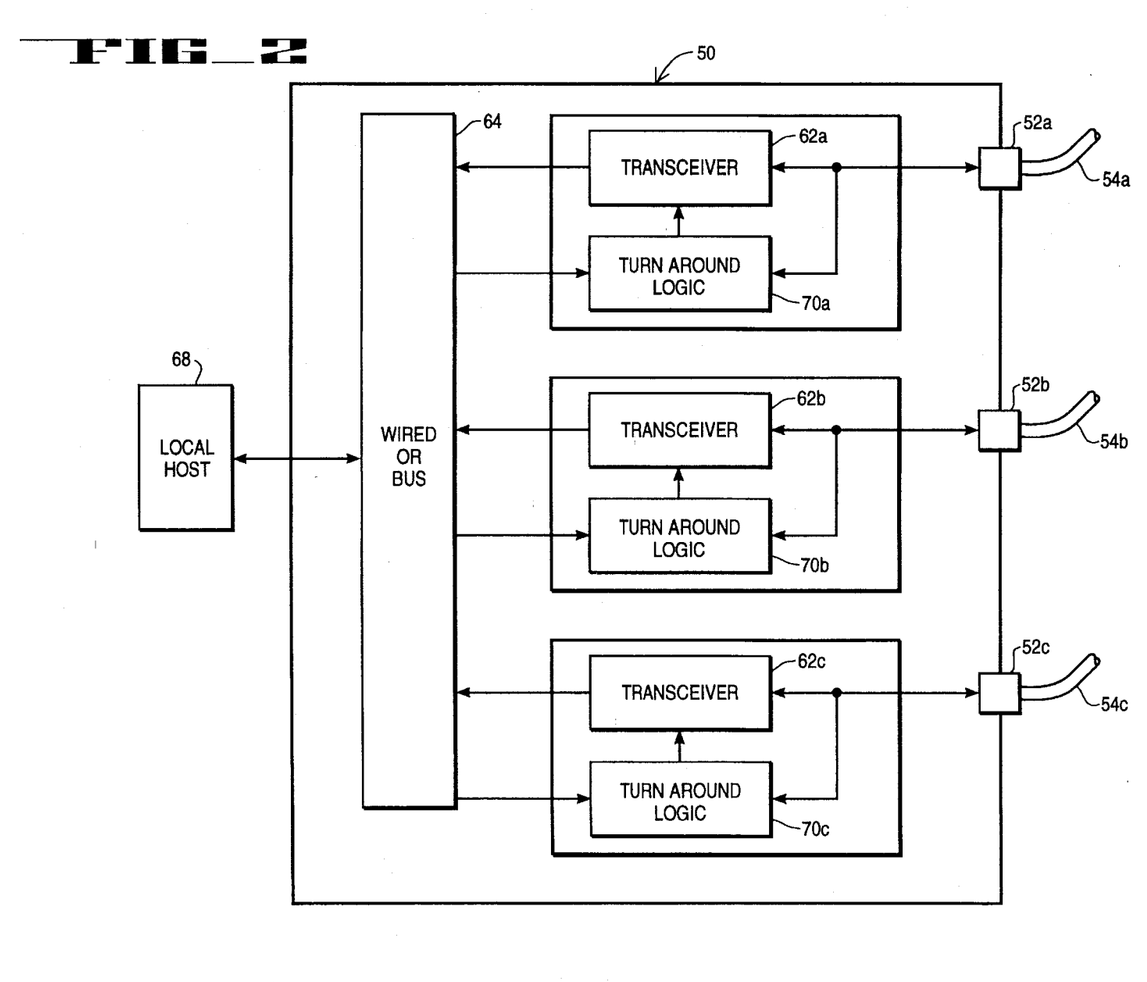
FIG. 2 is a block diagram of one of the nodes illustrated in FIG. 1.

Reference is made to FIG. 2 which is a block diagram of a node 50. Preferably, the node 50 is formed on a single silicon chip. A plurality of sockets 52a–d are provided to connect connector cables 54a–d with external nodes such as those shown in FIG. 1. For purposes of description when repeated parts are discussed, a single reference numeral may used to refer to each of those parts if a particular one is not being referenced. For example, "52" may be used in some instances to reference any of the parts indicated by the reference numerals "52a–d".

The sockets 52 and the cables 54 form point-to-point communication links with other nodes (other nodes are illustrated in FIG. 1). In a point-to-point communication link, the only connections are those at the two ends. There are no taps or other impedance discontinuities to corrupt electrical performance, and as a result, a point-to-point link has a significant speed advantage over traditional multi-access buses. Other point-to-point links that could be utilized include optical links, coaxial cables, and microstrips. In general, any communication link that can provide at a minimum half duplex bidirectional data transfer will be an adequate point-to-point link. Of course, a full duplex data transfer link will provide increased performance over a half duplex system.

Each socket 52 is coupled to its respective port 60: socket 52a is coupled to port 60a, socket 52b is coupled to port 60b, and so forth. As illustrated, the node 50 has four ports 60 labeled "60a, 60b, 60c, 60d." In other embodiments, a node may have one port, two ports, three ports, or more than four ports 60. Each port 60 includes a transceiver 62 that includes a conventional receiver and a conventional transmitter which will be described in more detail subsequently.

The transceiver 62 is coupled to a conventional wired-OR bus 64 which provides a dominant high logic. Conventional circuits (not shown) provide wired-OR operation of the bus 64. In other embodiments, another dominant state logic could be used, such as a wired-AND bus which would implement a dominant low logic.

The wired-OR bus 64 is coupled to a local host 68 for transmitting and receiving data. The local host 68 includes control logic and software for arbitrating access to the bus. The local host 68 includes an additional port (not shown) for connecting with the wired-OR bus 64.

Each port 60 also includes turn-around logic 70 that is coupled to the transceiver 62 to control the direction of signal flow therethrough. The turn-around logic 70 is also coupled to the wired-OR bus 64 and to the input to the transceiver 62 in order to monitor the digital signal thereon, as will be described in more detail.

Figure 3:
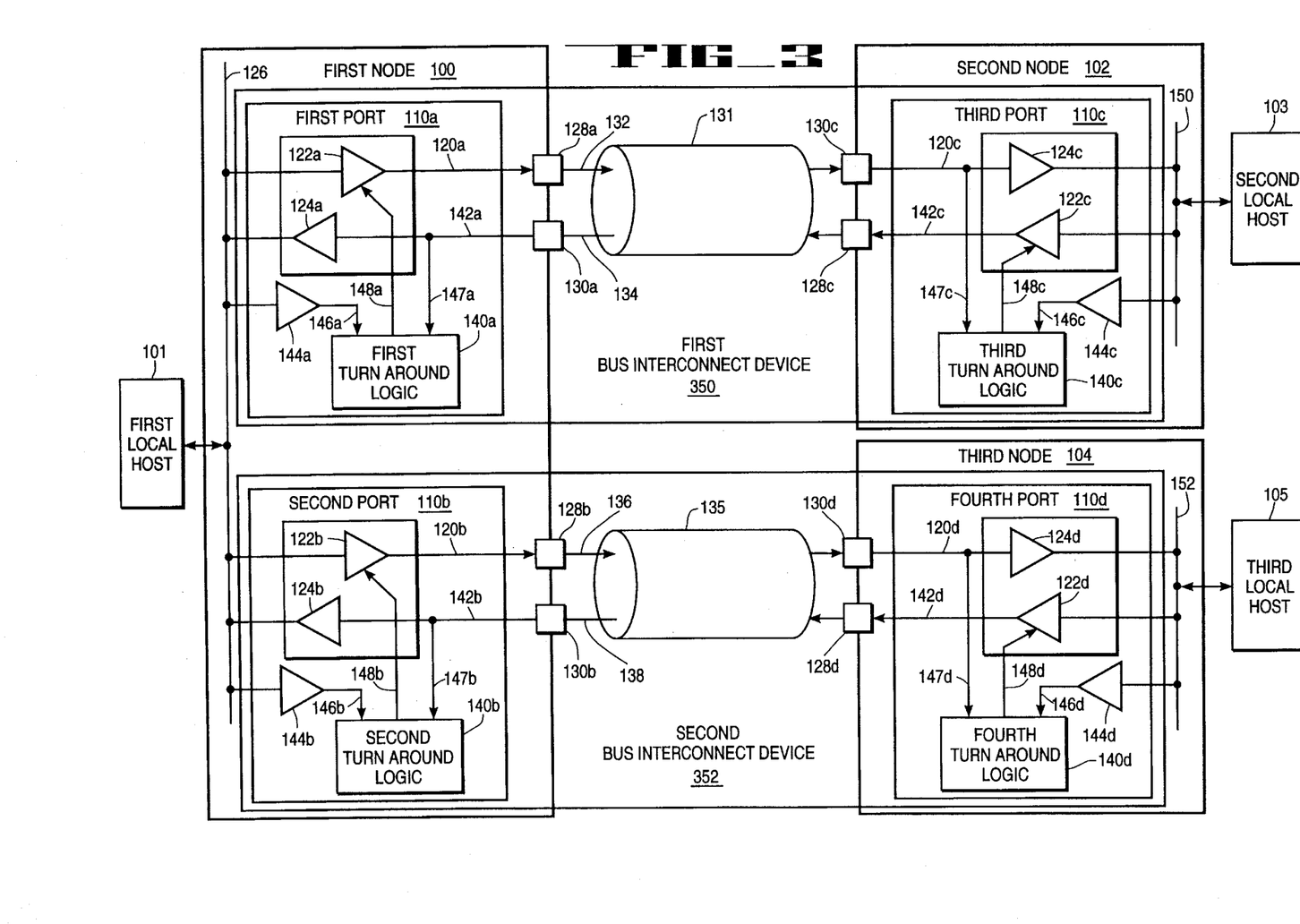
FIG. 3 is a block diagram of four ports including a first port connected to a second port and a third port connected to a fourth port, the first and third ports being connected by a single bus.

FIG. 3 is a block diagram of a communication system including three interconnected nodes: a first node 100, a second node 102 and a third node 104. The first node 100 includes a first port 110a and a second port 110b. The second node 102 includes a third port 110c. The third port includes a fourth port 110d. The ports 110a–d are identical in construction, and therefore the following description of the port 110a applies also to the other ports in the system of FIG. 3.

The first port 110a includes a first transceiver 120a that includes a first transmitter 122a and a first receiver 124a. The first transmitter 122a is coupled to transmit a signal on a first bus 126 in the first node 100a, and to supply it to a transmit output coupler 128a. The receiver 124a is coupled to receive a signal from a receive coupler 130a and to supply it to the first bus 126.

A first cable 131 connects the first port 110a with the third port 110c, to provide a point-to-point link between the first node 100 and the second node 102. In the first cable 131, a first signal line 132 connects the first transmit output coupler 128a with the third receive coupler 130c, and a second signal line 134 connects the first receive coupler 130a with the third transmit coupler 128c. A second cable 135 connects the second port 110b with the fourth port 110d, to provide a point-to-point link between the first node 100 and the third node 104. In the second cable 135, a third signal line 136 connects the second transmit output coupler 128b with the fourth receive coupler 130d, and a fourth signal line 138 connects the second receive coupler 130b with the fourth transmit coupler 128d. The signal lines 132, 134, 136, and 138 could include any conventional point-to-point link such as a wire, optical link, coaxial cable, or microstrip.

A first remote bus interconnect device 350, to be described subsequently, includes the first port 110a, the cable 131, and the third port 110c. The concept of a "remote bus interconnect device" is useful for explaining the coupling between the first bus 126 and the second bus 150. A second remote bus interconnect device 352, to be described subsequently, includes the second port 110b, the second cable 135, and the fourth port 110d.

A first turn around logic 140a is coupled to the first transmitter 122a to control whether the first transmitter 122a is enabled (the "on" state) in which it is transmitting the signal on the bus 126, or disabled (the "off" state) in which it outputs the non-dominant state of the first bus 126. The first turn around logic 140a is also coupled to a line 142a which is the input line to the receiver 124a. A first bus monitor 144a is coupled to the first bus 126 and the first turn around logic 140a in order to supply the first turn around logic 140a with a signal indicative of the value on the first bus 126.

The above description, which specifically references features of the first port 110a, is also applicable to the second port 110b, the third port 110c, and the fourth port 110d, with the exception that the second node 102 includes a second bus 150 that is coupled to the third port 110c, and the third node 104 includes a third bus 152 that is coupled to the fourth port 110d.

Input signals to turn around logic 140 include an RxLB signal on a line 146 (FIG. 3) and an RxRB signal on a line 147 (FIG. 3). The designation "LB" refers to "local bus", and the designation "RB" refers to "remote bus". The local bus is defined to be in the same node as "local" transmitter 122 and "local" turn around logic 140. For example, the first bus 126 is the local bus with respect to local transmitter 122a and local turn around logic 140a in FIG. 3. The remote bus signal (RxRB) is defined to be the value received by the port 110a from the remote node, for example the value received in the first port 110a by the receiver 124a from the transmitter 122c.

Table 1 describes operation of the turn around logic circuit with reference to nominal "high" and "low" values. The high value is dominant, and the low value is non-dominant. It should be remembered these nominal values are exemplary. The turn around logic can be implemented in any system that implements a dominant logic, as will be apparent to one skilled in the art. For example, the roles of the high and low could be reversed in other embodiments, or a high impedance state could be used.

TABLE 1

| | Turn Around Logic State | |
| --- | --- | --- |
| Local Bus Signal (RxLB) | Remote Bus Signal (RxRB) | Local Bus Transmitter 122 (TxEn) |
| X (don't care) | high (1) | disabled (low) |
| low (0) | low (0) | same as previous state |
| high (1) | low (0) | enabled |

Further details of operation of the turn around logic 140 are described later with reference to FIG. 5. However, from the above Table 1 it may be noted that if the remote bus signal (RxRB) is high (dominant), then the turn around logic 140 will cause the local bus transmitter 122 to be disabled and therefore to output the non-dominant (low) state regardless of the signal on the local bus. As a result, latch-up in the system is prevented because only one of the two interconnected ports can output the dominant state.

If the remote bus signal (RxRB) is low, then the status of the local transmitter 122 depends upon the value of the local bus signal (RxLB). If the local bus signal is high (the dominant state), then the bus transmitter 122 will be enabled, but if the local bus signal (RxLB) is low (non-dominant) then the previous state of the bus transmitter 122 will be continued.

The bus transmitter 122 is enabled or disabled by the control signal TxEn on the line 148. An enabled bus transmitter 122 outputs a signal identical with its input signal: A disabled bus transmitter 122 outputs a signal equal to the non-dominant state of the bus. In the case of this specific implementation the bus transmitter 122 is enabled by an active high signal and its operation is described in Table 2:

TABLE 2

| Control Signal: Bus Transmitter 122 Enable (TxEn) | Output: Bus Transmitter 122 |
| --- | --- |
| low | disabled - outputs non-dominant state (low) |
| high | same as local bus |

Figure 4:
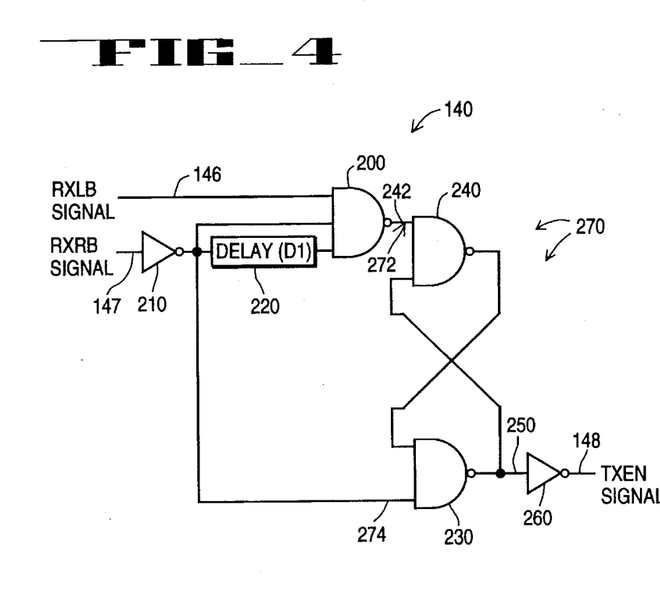
FIG. 4 is a circuit diagram of turn around logic for each port.

Reference is now made to FIG. 4, which is a circuit diagram of turn around logic 140 implemented with logic gates. The RxLB signal on the line 146 is supplied directly to a three-input NAND gate 200. The RxRB signal on the line 147 is applied to an inverter 210. The output of the inverter 210 is applied to a delay circuit 220, the NAND gate 200, and a two-input NAND gate 230 that is cross-coupled with a second two-input NAND 240. Particularly, the output of the first NAND gate 230 is applied to an input of the second NAND gate 240, and the output of the second NAND gate 240 is applied to an input of the first NAND gate 230. The second NAND gate 240 receives a second input on the line 242 from the three-input NAND gate 200. The output of the first NAND gate 230 is applied on a line 250 to an inverter 260, which outputs the control signal TxEn signal on the line 148 to the transmitter 122.

The cross-coupled NAND gates 230 and 240 operate as an output latch 270 to store a digital value therein. The latched digital value will remain the same if both inputs are high; i.e., if a first input signal 272 from the three-input NAND gate 200 is high, and a second input signal 274 from the inverter 210 is high. However, if the second input signal 274 is low, then the output of the latch 270 is high regardless of the first input signal 272. If the first input signal 272 is low and the second input signal 272 is high, then the latch output is low.

The turn around logic 140 includes a delay circuit 220 coupled between the inverter 210 and an input to the 3-input NAND gate 200. The delay circuit 220 produces a delay for a time period D1 that delays the control signal TxEn to compensate for propagation delays. The purpose of the delay is to prevent a glitch that could otherwise occur and reduce performance during arbitration, at the beginning of data transfer, and possibly continuing through data transfer. Specifically, the delay circuit 220 prevents a glitch that would occur on a high-to-low transition of a transmitting node, and this glitch would cause both transmitters to be temporarily "on" at the same time. For the implementation of the first turn around logic 140a, this delay D1 is longer than the worst case propagation delay of a "high" to "low" transition through the first bus receiver 124a and the first bus monitor 144a. For the implementation of the second turn around logic 140b, this delay is longer than the worst case propagation delay of a "high" to "low" transition through the third bus receiver 124c and the third bus monitor 144c. As a result, the delay D1 guarantees that interconnected ports maintain their previous state when both interconnected buses are in the non-dominant state.

Figure 5:
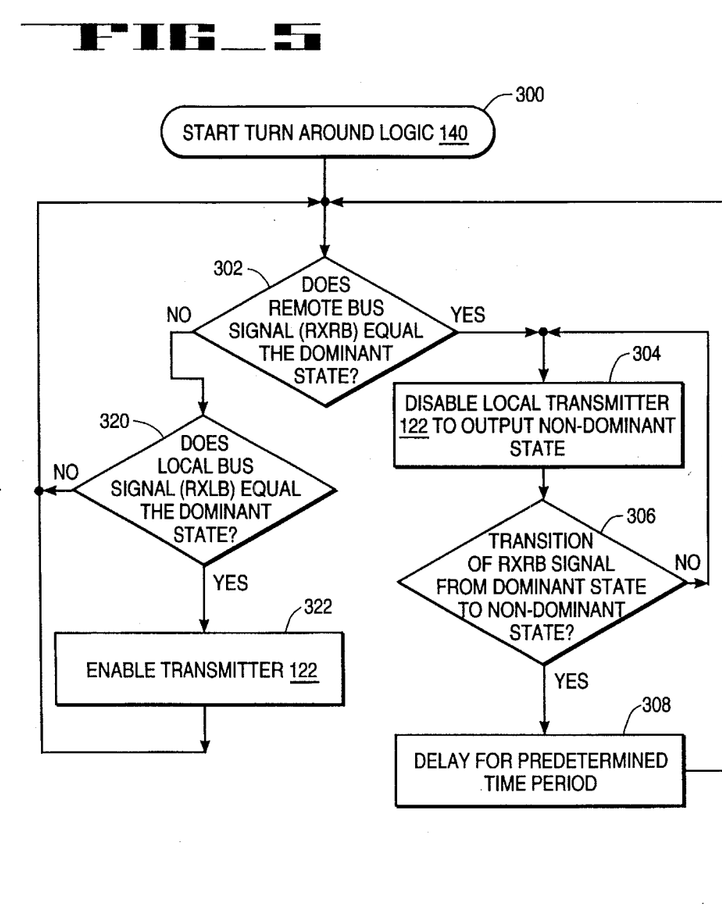
FIG. 5 is a flow chart illustrating operation of turn around logic in each port.

Reference is now made to FIG. 5, which is a flow chart of operations within the turn around logic 140. Beginning in a box 300 operations start in the turn around logic 140. In a decision box 302, operation branches dependent upon whether the remote bus signal (RxRB) equals a dominant state, which is high in the preferred embodiment. If the remote bus signal is high, then operation branches to the box 304 in which the local transmitter 122 is disabled so that it outputs a low (non-dominant) state. Operation then continues to the decision box 306, which looks for a high-to-low (i.e., dominant to non-dominant) transition of the RxRB signal. While the RxRB signal remains high, operation loops through the boxes 304 and 306, and the transmitter remains disabled. Upon a high-to-low transition, operation branches from the box 306 to the box 308 in which a delay occurs for a predetermined time period. This delay is represented in FIG. 4 by the delay circuit 220, and in FIG. 9 (to be described) by the delay circuits 610 and 612. Following the delay in the box 308, operation returns to the decision box 302.

From the decision box 302, if the remote bus signal is low, operation moves to the box 320 from which operation branches dependent upon whether the local bus signal is high. If the local bus signal is high, then operation branches to the box 322 in which the local transmitter 122 is enabled, and operation then loops back to the decision box 302, and continues to loop through the boxes 302, 320, and 322 until a change occurs in one of the conditions in those boxes. If the local bus signal is low (non-dominant) then operation branches from the decision box 320, returns to before the decision 302 and continues to loop through the boxes 302 and 320 until a change occurs in one of the conditions in those boxes.

Reference is again made to FIG. 3. The combination of the first port 110a, the cable 131, and the third port 110c define a first remote bus interconnect device 350. A second remote bus interconnect device 352 includes the second port 110b, the cable 135, and the fourth port 110d. The first remote bus interconnect 350 connects the first bus 126 with the second bus 150, and the second remote bus interconnect device 352 connects the first bus 126 with the third bus 152. In other embodiments, additional ports may be provided in the first node 100, the second node 102, or the third node 104 in order to connect with still further additional buses and ports (not shown). Such a configuration would add to the network of interconnected buses illustrated in FIG. 3.

The turn around logic 140 controls the transceivers coupled to the interconnected buses, including the first bus 126, the second bus 150, and the third bus 152, so that the buses appear to be a single logical bus. If there are additional buses that are connected with additional bus interconnect devices (not shown), then these additional buses would also become part of the same logical bus. In general, if there are N distinct physical bus segments that form a single logical bus, then N−1 bus interconnect devices are required.

During the arbitration phase, the bus interconnect devices 350,352 guarantee that the state of the three physical buses 126, 150, and 152 is identical. If the state of the three physical buses were not to be identical for a short time, then the interconnect devices 350,352 makes them identical, however at all times the dominant mode of the bus is followed. During the data transfer phase, the data which is supplied to the physical bus in the winning node must be communicated from that physical bus to all other physical buses that comprise the single logical bus. The following discussion will describe arbitration and data transfer in more detail, and then provide an example.

Arbitration logic is supplied from local hosts 101, 103, and 105 connected to the first node 100, the second node 102, and the third node 104. During arbitration, each local host that desires access to the single logical bus will attempt to place a series of digital signals on the bus, and the value on the single logical bus is monitored. It should be remembered that the individual buses 126, 150, and 152 have a dominant state logic, and therefore the single logical bus has a dominant state logic. If, after any signal, the local host does not see its own signal on the bus, then it knows that it has lost the arbitration process and does not continue placing signals on the bus. The arbitration signals must have a length that is equal to the longest propagation delay in the worst possible case in a particular system. Therefore, the length of the arbitration signal must be sufficiently long for a dominant state signal asserted by a node at one end of the system to pass through each intermediate node and arrive at node on the other end of the system.

In the arbitration process, the winning node will transmit all its arbitration signals on the bus, and will see all those signals on the bus. As a result, it is a property of this arbitration process that the last dominant state signal transmitted must have been generated at the winning node. Therefore, at the end of the arbitration process, the ports are configured for unidirectional data flow from that winning node to all other nodes, and that configuration does not change throughout data transfer as long as only the winning node places signals on the bus. High speed data transfer is facilitated thereby.

An example of an arbitration for the three ports illustrated in FIG. 3 follows. FIG. 6 is one example of the arbitration and data transfer process for the three nodes 100, 102, and 104 illustrated in FIG. 3. The time periods are specified across the top of the first example. The arbitration process occurs during the times $T_1$ through $T_7$, and the data transfer process begins in time periods $T_8$ and continues for an arbitrary number of cycles. Because the typical data transfer rates can proceed much faster than arbitration, the periods $T_8$, $T_9$, and continuing throughout the data transfer state can be substantially shorter than the arbitration periods $T_1$ through $T_7$, in accordance with conventional techniques.

Each node 100, 102, and 104 is connected to its respective local host 101, 103, and 105, and during arbitration each host places its own distinct sequence of values on the bus in accordance with any conventional dominant state logic arbitration method. In FIG. 6, each node 100, 102, 104 places a "1" on the single logical bus in the time period $T_1$, which is the dominant state. As a result, in the time period $T_1$, the digital value on the single logical bus is "1", and each of the nodes 100, 102, and 104 monitors the single logical bus and sees the value that it placed on the bus. In the next period $T_2$, the first node 100 places a "1", the second node 102 places a "0", and the third node 104 places a "1." Because the second node 102 placed a "0" and because the dominant state is "1", the second node 102 does not see its value on the bus and it knows that it has lost arbitration. Therefore in the succeeding time periods $T_3$ through $T_7$, as illustrated at 400, the second node 102 does not assert the dominant state; i.e., it places the non-dominant state ("0") on the bus. The first node 100 and the third node 104 continue placing their values on the single logical bus until the time period $T_5$, in which the third node 104 places a "0" on the single logical bus and the first node 100 places a "1". The value on the bus is "1" because that is the dominant logic, and therefore the third node 104 is no longer in contention for the bus, and no longer asserts the dominant state, illustrated beginning at 402. The first node 100 continues to place signals on the bus until the time period $T_7$, after which the arbitration process is complete. During the data transfer state, it is assumed that no data is generated except by the winning node, which is the first node 100 in the first example.

The lower portion of the first example in FIG. 6 specifies whether the transmitters 122a, 122b, 122c, and 122d are enabled (designated by "on"), disabled (designated by "off"), or continuing with their previous state (designated by a "p" following the state). An initial state is assumed for the purpose of this example; however, any arbitrary allowable initial state could be the initial state. When operation begins, typically, a reset function clears the values on the bus so that each short bus does not output the dominant state. It may be useful to refer to Table 1 or the flow chart of FIG. 5 to understand transmitter control in the following discussion.

In the first time period $T_1$ of the first example, the transmitter 122a remains off because the high signal received through the "on" transmitter 122c causes the transmitter 122a to be disabled, or "off". The transmitter 122c remains on because its local bus is high and the remote bus signal is low, and therefore it remains enabled in accordance with Table 1. The transmitter 122b remains off because the transmitter 122d is still supplying its high value through the transmitter 122d, and therefore the transmitter 122b remains disabled, or "off".

In the next time period $T_2$, the transmitter 122c outputs a low signal which is received in the first port 110a and supplied on the line 147a to the first turn around logic 140a. The output of the transmitter 122a is enabled because the remote bus signal is now low and the local bus signal is high. Subsequently, when the third port 110c receives the high signal through the enabled transmitter 122a on the line 120c and line 147c, the third turn around logic 140 receives that signal and in accordance with Table 1 disables the bus transmitter 122c. Therefore, at 410, the entry in time period $T_2$ for transmitter 122 indicates an initial "on" which then changes to a subsequent "off".

In the time period $T_3$, the state remains unchanged. In the next time period $T_4$, the previous transmitter states are retained. In the time period $T_5$, the low value on the third bus 152 is propagated through the transmitter 122d to the second port 110b. Therefore, because the local bus 126 is high, the second turn around logic 140b turns the transmitter 122b on, which supplies a high signal from the first bus 126 to the line 120d, which is received by the fourth turn around logic 140d, and then causes the transmitter 122d to be disabled. Therefore, the entry in time period $T_5$, at 412, indicates that transmitter 122d is initially on, and then turns off. In the next two time periods $T_6$ and $T_7$, and continuing through the data transfer state beginning at time $T_8$, the transmitter state remains the same.

Under certain circumstances during arbitration, the transmitters may oscillate between on and off. However, this does not affect the operation of the bus interconnect device 350 or 352, and therefore the single logical bus is retained.

Beginning at time $T_8$ and continuing through the data transfer state, the configuration of the transmitters 122a, 122b, and 122c provides for unidirectional data transfer from the first node to the second node, specifically from the transmitter 122a to the third receiver 124c and thereon to the second bus 150. Furthermore, the digital values flow from the transmitter 122b through the receiver 124d and to the bus 152. This configuration continues throughout data transfer because the first node 100 is the only node that is transmitting data. The second node 102 and the third node 104 know that they have lost the arbitration process and therefore do not place any dominant values on the bus until the next arbitration period begins.

Figure 7:
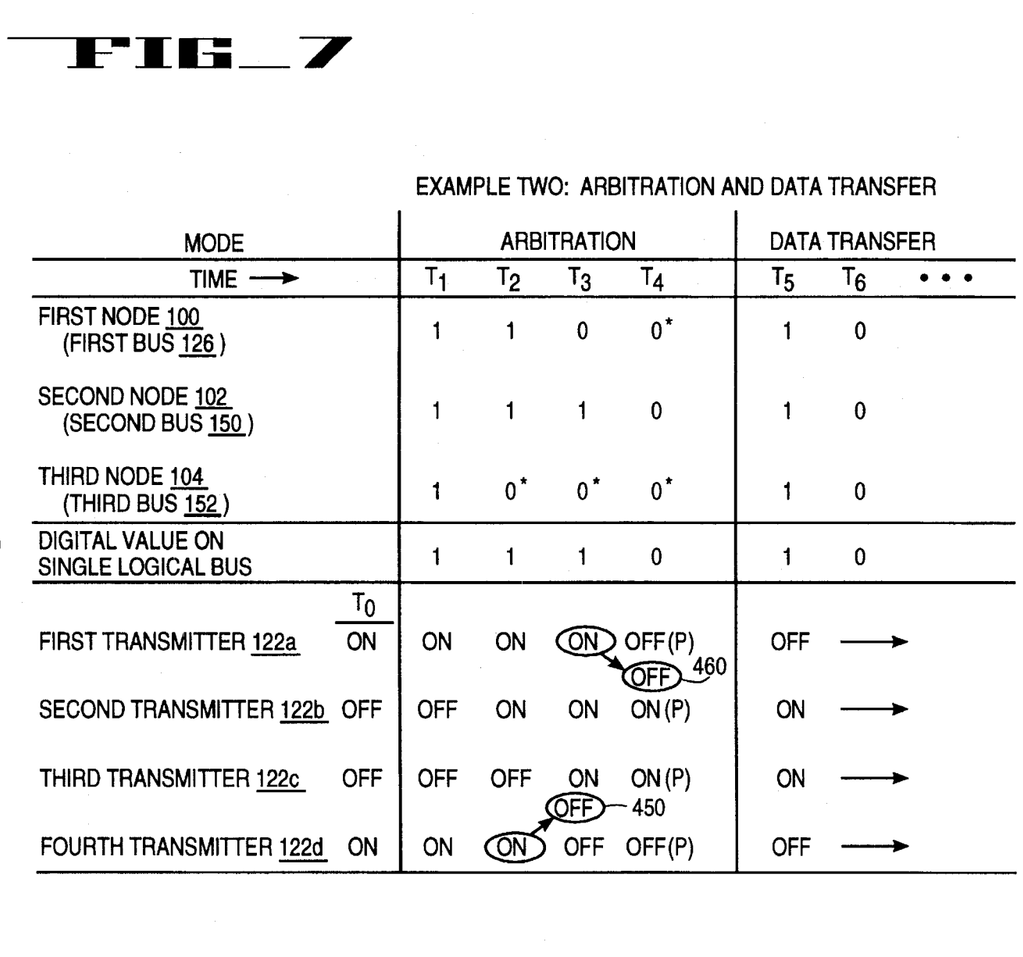
FIG. 7 is a second example of arbitration and data transfer, illustrating the value on the single logical bus and the state of the transmitters in each port illustrated in FIGS. 4 and 5.

Reference is now made to FIG. 7, which is a second example of arbitration and data transfer. For convenience, the arbitration period has been shortened to four periods. In FIG. 7, arbitration results in the second node 102 winning the arbitration. Therefore, in time period $T_4$, and continuing in the data transfer stage in $T_5$, the third transmitter 122c is "on" which allows data to be transmitted through the second signal line 134 in cable 131, to the first receiver 124a, and then to the first bus 126. The first transmitter 122a remains off. Furthermore, the second transmitter 122b remains "on" which allows transmit the value from the first bus 126 to be transmitted through the third signal line 136 in the cable 135 to the receiver 124d and the fourth bus 152. The fourth transmitter 122d remains off so that it does not affect the value on the first bus 126.

Thus, in FIG. 7, in the data transfer phase, unidirectional data transfer is provided in the first bus interconnect device 350, specifically data is transmitted from the third port 110c to the first port 110a and then to the first bus 126. Furthermore, unidirectional data transfer is provided in the second bus interconnect device 352: data is transmitted from the first bus 126 through the second transmitter 122b and the second port 110b into the fourth port 110d into the third bus 152. When additional ports are connected by additional interconnect devices, operation continues similarly, and the information may pass through many nodes, all of which operate together as a single logical bus during operation and pass data unidirectionally in the data transfer state.

Therefore, it has been shown that during a dominant mode arbitration, the bus interconnect devices 350, 352 operate to provide a single logical bus, and during data transfer the interconnect devices 350, 352 operate to provide unidirectional data transfer from the winning node.

Figure 9:
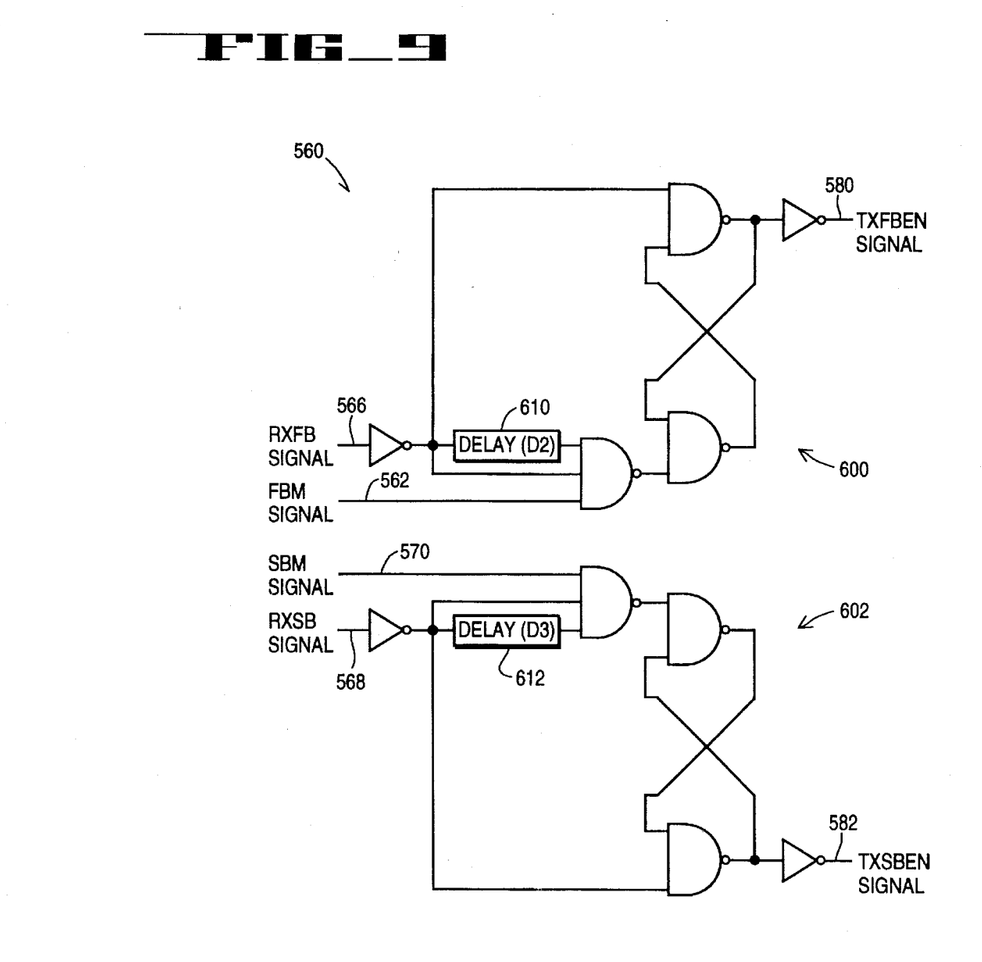
FIG. 9 is a circuit diagram of combined turn around logic for the bus interconnect device of FIG. 6.

Reference is now made to FIGS. 8 and 9. FIG. 8 illustrates a bus interconnect device 500 that does not include a cable such as the cables 131 and 135 illustrated in FIG. 3. The bus interconnect device 500 couples a first bus 514 with a second bus 530. Operation of the bus interconnect device 500 is similar to that of the remote bus interconnect devices 350, 352, and reference is hereby made to the previous discussion.

In application, the bus interconnect device 500 is particularly useful to connect two buses that are closely positioned. For example, the bus interconnect device 500 is useful to connect two closely positioned buses in a computer or a computer chip. Multiple bus interconnect devices 500 could be used to connect multiple physical bus segments on a single silicon chip. The bus interconnect device 500 is useful for effectively extending the length of a bus without the problems incident when a very long bus is formed. A bus interconnect device 500 can function as a repeater, which allows connection of multiple short buses that can replace a single long bus. Each short bus, i.e., each segment, is advantageous because it can have a shorter length and fewer loads (taps) than a single long bus.

A first local host 510 is coupled through an internal port 512 to the first bus 514. The internal port 512 can be directly controlled by the first local host 510. One or more additional ports, such as a port 520 can be coupled to the first bus 514. Port 520 includes the turn around logic 140 and the transceiver 120 (see FIG. 3 and accompanying description for additional description).

The bus interconnect device 500 connects the first bus 514 with the second bus 530. A second local host 532 is coupled to the second bus 530 via an internal port 534 that can be directly controlled by the second local host 532. The bus interconnect device 500 includes a first bus transmitter 540 whose input is coupled to the first bus 514 to receive and transmit a signal therefrom on a line 542. The output of the first bus transmitter 540 on the line 542 is applied to the second bus receiver 544, which has an output connected to the second bus 530. The bus interconnect device 500 also includes a second bus transmitter 546 whose input is coupled to the second bus 530 to receive and transmit a signal therefrom on a line 548 to a first bus receiver 550. The output of the first bus receiver 550 is applied to the first bus 514. Therefore, a message can be transmitted from the first bus 514 to the second bus 530 via the first bus transmitter 540 and the second bus receiver 544, and a message can be transmitted from the second bus 530 to the first bus 514 via the second bus transmitter 546 and the first bus receiver 550.

The bus interconnect device 500 also includes combined turn around logic 560, which is described further with reference to FIG. 9. An input to the combined turn around logic 560 is a FBM signal on a line 562 which is coupled to the first bus 514 through a first bus monitor 564. Another input into the combined turn around logic 560 includes a RxFB signal on a line 566 from the line 548. Another input includes a RxSB signal on a line 568 from the line 542. Another input is provided by an SBM signal on a line 570 which is coupled to the second bus 530 through a second bus monitor 572. The outputs of the combined turn around logic 560 control the first bus transmitter 540 with a signal RxFBEn signal on a line 580 and a RxSBEn signal on a line 582. Particularly, the line 580 is coupled to the first bus transmitter 540, and the line 582 is coupled to the second bus transmitter 546.

Reference is now made to FIG. 9 which is a circuit diagram of the combined turn around logic 560. It should be noted that the combined turn around logic circuit 560 includes a first turn around logic circuit 600 and a second turn around logic circuit 602, which operate identically to the turn around logic 140, described with reference to the preceding discussion, and particularly with reference to Table 1 and FIG. 5. Particularly, if the FBM signal is submitted for the RxLB signal, and the RxSB signal is substituted for the RxRB signal, then operation is proceeds in accordance with Table 1 and FIG. 5. Similarly, if the SBM signal is substituted for the RxLB signal, and the RxFB signal is substituted for the RxRB signal, then operation also proceeds in accordance with Table 1 and FIG. 5.

The RxFB signal on the line 566 and the FBN signal on the line 562 are the inputs into the first turn around logic circuit 600, and an output TxFBEn is supplied on the line 580. Similarly, the inputs to the second turn around logic circuit 602 include the SBM signal on the line 570 and the RxSB signal on the line 568. The output of the second turn around logic circuit 602 is the TxSBEn signal on the line 582.

The first turn around logic circuit 600 includes a delay circuit 610 which delays the input signal for a delay period D2. The length of this delay period D2 is longer than the worst case propagation delay of a high-to-low transition through the first bus receiver 550 and the first bus monitor 564. Furthermore, the second turn around logic 602 includes a delay circuit 612 which produces a delay for a period D3. The length of the delay period D3 is longer than the worst case propagation delay of a high-to-low transition through the second bus receiver 544 and the second bus monitor 572.

From the above description, it will be apparent that the invention disclosed herein provides a novel and advantageous node interconnect device including turn around logic. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

APPENDIX A

Acronyms used for FIGS. 3 and 4:

RxLB: receiver local bus

RxRB: receiver remote bus

TxEn: transmitter enable

Acronyms used for FIG. 9:

FBM: first bus monitor

SBM: second bus monitor

RxFB: receiver first bus

RxSB: receiver second bus

TxFBEn: transmitter first bus enable

TxSBEn: transmitter second bus enable

What is claimed is:

1. A node in a communication network for coupling to a second node by a point-to-point link including a first signal line and a second signal line, the communication network including a plurality of nodes interconnected by point-to-point links, said first node comprising:

a local physical bus having a dominant state; and at least one port coupled to said local physical bus, including a transmit connection for coupling to the first signal line, a receive connection for coupling to the second signal line to supply a RB signal, a bidirectional transceiver including a receiver and a transmitter, said receiver coupled to the receive connection and said transmitter coupled to the transmit connection, said bidirectional transceiver coupled to receive a TxEN control signal having a first value that enables the transmitter to transmit from the local physical bus to the first signal line, and a second value that disables the transmitter so that it outputs a non-dominant state on the first signal line, a LB monitor coupled to the local bus for supplying a LB signal having a value indicative of the signal on the local bus, and a turn around logic circuit coupled to receive the RB signal and the LB signal, and to supply said TxEN control signal responsive thereto, said turn around logic including an output latch for storing said TxEN control signal, said turn around logic operating so that if said RB signal is high, then said TxEn signal has said first value, if said RB signal is low and said LB signal is high, then said TxEn signal has said second value, and if said RB signal is low and said LB signal is low, then said TxEn signal remains unchanged from its latched value stored in said output latch.

2. The first node of claim 1 wherein the turn around logic comprises a delay circuit that delays recognition of the RB signal by the turn around logic on a high-to-low transition of the RB signal for a delay time period greater than the propagation delay period of a signal through the receiver and the LB monitor.

3. The first node of claim 1 wherein the turn around logic includes an inverter coupled to the RB signal, a first NAND gate coupled to receive the inverted RB signal and the LB signal, a pair of cross-coupled NAND gates including a second NAND gate having a first input coupled to receive the output of the first NAND gate and a third NAND gate coupled to receive the inverted RB signal, one of said first value and said second value of said TxEN signal being supplied by the output of the third NAND gate.

4. The first node of claim 3 wherein the turn around logic further comprises an inverter coupled to receive the RB signal, a delay circuit coupled to receive the inverted RB signal from the inverter, said delay circuit providing a delayed inverted RB signal to the first NAND gate having a delay time period greater than the propagation delay of a signal through the receiver and the LB monitor.

5. A bus interconnect device for coupling a first physical bus and a second physical bus having a dominant state, said first physical bus coupled to a first local host and said second physical bus coupled to a second local host, said bus interconnect device comprising a first port including a first transceiver including a first transmitter and a first receiver coupled to said first physical bus, and a first turn around logic circuit coupled to said first transceiver for controlling signal flow therethrough;

a second port including a second transceiver including a second receiver and a second transmitter coupled to said second physical bus, said second receiver coupled to said first transmitter and said second transmitter coupled to said first receiver, and a second turn around logic circuit coupled to said second transceiver for controlling signal flow therethrough;

a point-to-point link coupling said first port to said second port; and said first and said second turn around logic circuits including means for providing a single logical bus during arbitration by said local hosts and a unidirectional circuit during data transfer between said first local host an said second local host.

6. The bus interconnect device of claim 5 further comprising:

a first LB monitor for supplying a first LB signal indicative of the signal on the first physical bus;

means for supplying a first RB signal indicative of the signal transmitted by said first transmitter;

a second LB monitor for supplying a second LB signal indicative of the signal on the second physical bus;

means for supplying a second RB signal indicative of the signal transmitted by said second transmitter;

said first transceiver including means for receiving a first TxEN control signal having a first value that enables the first transmitter to transmit from the local physical bus to the second receiver, and a second value that disables the transmitter so that it outputs a non-dominant state to the second receiver, said second transceiver including means for receiving a second TxEN control signal having a first value that enables the second transmitter to transmit from the second physical bus to the first receiver, and a second value that disables said second transmitter so that it outputs a non-dominant state to the first receiver;

wherein said first turn around logic circuit is coupled to receive the second RB signal and the first LB signal, and to supply said first TxEN control signal responsive thereto, said first turn around logic including a first output latch for storing said first TxEn control signal, said first turn around logic operating so that if said second RB signal is high, then said first TxEn signal has said first value, if said second RB signal is low and said first LB signal is high, then said first TxEn signal has said second value, and if said second RB signal is low and said first LB signal is low, then said first TxEn signal remains changed from its latched value stored in the first output latch; and wherein said second turn around logic circuit is coupled to receive the first RB signal and the second LB signal, and to supply said second TxEN control signal responsive thereto, said second turn around logic including a second output latch for storing said second TxEN control signal, said second turn around logic operating so that if said first RB signal is high, then said second TxEn signal has said first value, if said first RB signal is low and said second LB signal is high, then said second TxEn signal has said second value, and if said first RB signal is low and said second LB signal is low, then said second TxEn signal remains unchanged from its latched value stored in the second output latch.

7. The bus interconnect device of claim 6 wherein the first turn around logic comprises a first delay circuit that delays recognition of the second RB signal on a high-to-low transition of the second RB signal for a delay time period greater than the propagation delay period of a signal through the first receiver and the first LB monitor.

8. The bus interconnect device of claim 7 wherein the second turn around logic comprises a second delay circuit that delays recognition of the first RB signal on a high-to-low transition of the first RB signal for a delay time period greater than the propagation delay period of a signal through the second receiver and the second LB monitor.

9. The bus interconnect device of claim 6 wherein each turn around logic includes an inverter coupled to the RB signal, a first NAND gate coupled to receive the inverted RB signal and the LB signal, a pair of cross-coupled NAND gates including a second NAND gate having a first input coupled to receive the output of the first NAND gate and a third NAND gate coupled to receive the inverted RB signal, one of said first value and said second value of said TxEN signal being supplied by the output of the third NAND gate.

10. The bus interconnect device of claim 9 wherein the each turn around logic further comprises a delay circuit coupled to receive the inverted RB signal, said delay circuit providing a delayed inverted RB signal to the first NAND gate having a delay time period greater than the propagation delay of a signal through the receiver and the LB monitor.

11. A communication network having a plurality of nodes coupled by point-to-point links each having a first signal line and a second signal line, said communication network having operating modes including an arbitration mode utilizing a single logical bus with a dominant logic, and a data transfer mode in which data flows unidirectionally from the winning node to all other nodes, said communication network comprising:

a plurality of point-to-point connectors;

a plurality of local hosts including a first local host and a second local host including communication means for supplying arbitration signals for a dominant state logic and data transfer signals;

a plurality of nodes connected with said point-to-point connectors, said plurality of nodes including a first node coupled to the first local host and a second node coupled to the second local host, said first node coupled to said second node with a first point-to-point link, each node including at least one port, each of said nodes including a local bus, at least one port having a bidirectional transceiver including a transmitter coupled to the first signal line and a receiver coupled to the second signal line, said bidirectional transceiver coupled to receive a TxEN control signal having a first value that enables the transmitter to transmit from the local bus on the first signal line, and a second value that disables the transmitter so that it outputs a non-dominant state on the first signal line, turn around logic coupled to the local bus to receive a LB signal therefrom, and also coupled to the point-to-point link to receive a RB signal therefrom, and also coupled to the bidirectional transceiver to control said bidirectional transceiver responsive to the LB signal on the local bus and the RB signal on the point-to-point link, so that during the arbitration period, the direction of data flow through said bidirectional transceiver implements a dominant state bus between the point-to-point link and the local bus, and so that during data transfer the direction of data flow is unidirectional from the winning node to all other nodes.

12. The communication network of claim 11 wherein each of said turn around logic circuits includes an output latch, said turn around logic circuits operating so that if the RB signal is high, then said TxEn signal has said first value;

if the RB signal is low and the LB signal is high, then said TxEn signal has said second value; and if the RB signal is low and the first LB signal is low, then said TxEn signal remains at the latched value stored in the first output latch.

13. The communication network of claim 12 further comprising:

a LB monitor coupled to the local bus to supply said LB signal; and wherein each turn around logic comprises a delay circuit that delays recognition of the RB signal on a high-to-low transition of the RB signal for a delay time period greater than the propagation delay period of a signal through the receiver and the LB monitor.

14. The communication network of claim 12 further comprising:

a LB monitor coupled to the local bus to supply said LB signal; and wherein each turn around logic circuit includes an inverter coupled to the RB signal, a first NAND gate coupled to receive the inverted RB signal and the LB signal, a pair of cross-coupled NAND gates including a second NAND gate having a first input coupled to receive the output of the first NAND gate, and a third NAND gate coupled to receive the inverted RB signal, one of said first value and said second value of said TxEN signal being supplied by the output of the third NAND gate.

15. The communication network of claim 14 wherein each turn around logic circuit further comprises an inverter coupled to receive the RB signal and a delay circuit coupled to receive the inverted RB signal from the inverter, said delay circuit providing a delayed inverted RB signal to the first NAND gate having a delay time period greater than the propagation delay of a signal through the receiver and the LB monitor.

16. A communication system for coupling a first physical bus, a second physical bus, and a third physical bus, said communication system comprising:

a first bus interconnect device for coupling the first physical bus and the second physical bus, including a first port having a first transceiver including a first transmitter and a first receiver coupled to said first bus, and a first turn around logic circuit coupled to said first transceiver for controlling signal flow therethrough, a second port having a second transceiver coupled to said second bus, said second transceiver including a second receiver coupled to said first transmitter and a second transmitter coupled to said first receiver, and a second turn around logic circuit coupled to said second transceiver for controlling signal flow therethrough, and a point-to-point link coupling said first port to said second port, said first and said second turn around logic circuits including means for providing a single logical bus during arbitration and a unidirectional circuit during data transfer; and a second bus interconnect device for connecting the first physical bus with the third physical bus, including a third port having a third transceiver including a third transmitter and a third receiver coupled to said first bus, and a third turn around logic circuit coupled to said third transceiver for controlling signal flow therethrough, a fourth port having a fourth transceiver coupled to said third bus, said fourth transceiver including a fourth receiver coupled to said third transmitter and a fourth transmitter coupled to said third receiver, and a fourth turn around logic circuit coupled to said fourth transceiver for controlling signal flow therethrough, and a point-to-point link coupling said third port to said fourth port, said third and said fourth turn around logic circuits including means for providing a single logical bus during arbitration and a unidirectional circuit during data transfer.

17. The communication system of claim 16 wherein:

said transceiver in each port is coupled to receive a TxEN control signal having a first value that enables the transmitter of said transceiver to transmit from the local bus, and a second value that disables the transmitter so that it outputs a non-dominant state; and said turn around logic circuit in each port is coupled to the local bus to receive a LB signal therefrom and to the point-to-point link to receive a RB signal therefrom, said turn around logic circuits each including an output latch for storing said TxEN value from said turnaround logic circuit, each of said turn around logic circuits operating so that if the RB signal is high, then said TxEn signal has said first value;

if the RB signal is low and the LB signal is high, then said TxEn signal having a has said second value; and if the RB signal is low and the first LB signal is low, then said TxEn signal remains at the latched value stored in the output latch of the turn around logic.

18. The communication network of claim 17 further comprising:

a LB monitor coupled to the local bus to supply said LB signal; and wherein each turn around logic comprises a delay circuit that delays recognition of the RB signal on a high-to-low transition of the RB signal for a delay time period greater than the propagation delay period of a signal through the receiver and the LB monitor.

19. The communication network of claim 17 further comprising:

a LB monitor coupled to the local bus to supply said LB signal; and wherein each turn around logic circuit includes an inverter coupled to the RB signal, a first NAND gate coupled to receive the inverted RB signal and the LB signal, a pair of cross-coupled NAND gates including a second NAND gate having a first input coupled to receive the output of the first NAND gate, and a third NAND gate coupled to receive the inverted RB signal, said TxEN signal being supplied by the output of the third NAND gate.

20. The communication network of claim 19 wherein each turn around logic circuit further comprises a delay circuit coupled to receive the inverted RB signal, said delay circuit providing a delayed inverted RB signal to the first NAND gate having a delay time period greater than the propagation delay of a signal through the receiver and the LB monitor.

21. A bus interconnect device for connecting two closely positioned buses having a dominant logic, said closely positioned buses including a first bus and a second bus, said bus interconnect device comprising:

a first bus transmitter coupled to the first bus to receive a first bus value and transmit a first RB signal, said first bus transmitter being controlled by a first TxEN signal having a first value that enables the transmitter to transmit from the local bus, and a second value that disables the first transmitter so that it outputs a non-dominant state;

a second bus receiver coupled to said first bus transmitter and the second bus for receiving the first transmitted value and supplying it to the second bus;

a second bus transmitter coupled to the second bus to transmit a second RB signal, said second bus transmitter being controlled by a second TxEN signal having a first value that enables the second transmitter to transmit from the second bus, and a second value that disables the second transmitter so that it outputs a non-dominant state;

a first bus receiver coupled to said second bus transmitter and the first bus for receiving the second transmitted value and supplying it to the first bus;

a first bus monitor coupled to the first bus for monitoring a first LB signal;

a second bus monitor coupled to the second bus for monitoring a second LB signal; and a combined turn around logic coupled to receive the first and second LB signals, the first and second RB signals, said turn around logic including a first output latch and a second output latch coupled to control the first bus transmitter and the second bus transmitter, in according with the following logic if the second RB signal is high, then said first TxEn signal has said first value, if the second RB signal is low and the first LB signal is high, then said first TxEn signal has said second value, if the second RB signal is low and the first LB signal is low, then said first TxEn signal remains at the latched value stored in the first output latch, if the first RB signal is high, then said second TxEn signal has said first value, if the first RB signal is low and the second LB signal is high, then said second TxEn signal has said second value, and if the first RB signal is low and the second LB signal is low, then said second TxEn signal remains at the latched value stored in the second output latch.

* * * * *